June 14, 1960

R. H. RILEY, JR 2,940,488

DEPTH GAUGE FOR POWER-OPERATED
SCREW-DRIVER, NUT-RUNNER, AND
THE LIKE

Filed Aug. 17, 1959

INVENTOR.
ROBERT H. RILEY, JR.

BY

*Leonard Bloom*

HIS ATTORNEY

June 14, 1960
R. H. RILEY, JR
2,940,488
DEPTH GAUGE FOR POWER-OPERATED
SCREW-DRIVER, NUT-RUNNER, AND
THE LIKE
Filed Aug. 17, 1959
2 Sheets-Sheet 2
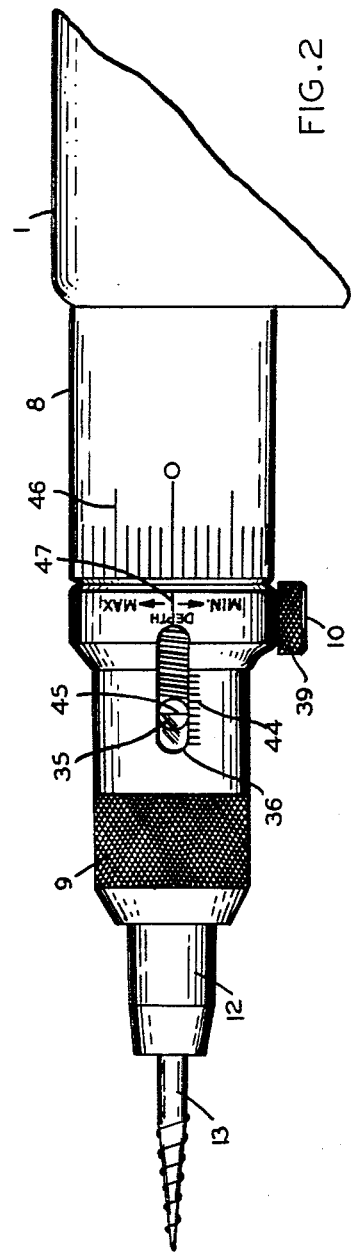
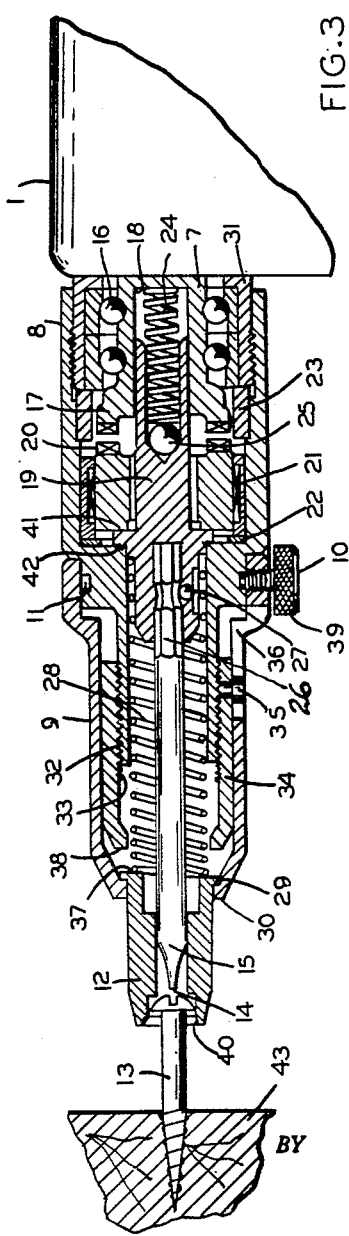
INVENTOR.
ROBERT H. RILEY, JR.
BY
Leonard Glass
HIS ATTORNEY

2,940,488

Patented June 14, 1960

2,940,488

DEPTH GAUGE FOR POWER-OPERATED SCREW-DRIVER, NUT-RUNNER, AND THE LIKE

Robert H. Riley, Jr., Towson, Md., assignor to The Black and Decker Manufacturing Company, Towson, Md., a corporation of Maryland Filed Aug. 17, 1959, Ser. No. 834,114

12 Claims. (Cl. 144—32)

The present invention relates to a depth gauge for a power-operated screwdriver, nut-runner, and the like, and more particularly, to such a depth gauge that will provide a depth control for driving a fastener to a predetermined desired depth.

It is an object of the present invention to provide a depth gauge for a power-operated screwdriver and the like that will control the depth to which a screw may be driven to a very high degree of accuracy.

It is another object of the present invention to provide a depth gauge that will be economical to manufacture either in conjunction with a complete and integral power-operated reversible screwdriver, nut-runner, and the like, or as a separate attachment therefor.

It is yet another object of the present invention to provide a depth gauge that will not mar the work surface and will be easy to manipulate.

Other objects of the present invention will become apparent from the following description taken in conjunction with the enclosed drawings, in which:

Fig. 2 is a close-up pictorial view of the depth gauge itself;

Fig. 3 is a sectional view of the depth gauge as shown in Fig. 2; and

In accordance with a preferred embodiment of the teachings of the present invention, a depth gauge is provided for a power-operated screwdriver and the like by means of a pair of coaxial superposed sleeves comprising an outer adjusting sleeve and an inner movable sleeve, the outer sleeve being axially restrained with respect to the tool housing but free to rotate about its axis, and the inner sleeve being mechanically coupled to the tool housing (as by suitable threads) so that its relative axial position with respect to the housing may be varied. Both sleeves are keyed together for rotation in unison in such a manner whereby a manual manipulation of the outer adjusting sleeve will cause the inner movable sleeve to either advance upon or withdrawn from the tool housing, depending upon the direction of rotation exerted by the operator in his manipulation of the outer adjusting sleeve. A spring-loaded coaxial finder sleeve, adapted to guide the tool driving bit into engagement with the screw or other fastener, is retained in the forwardmost portion of the outer adjusting sleeve and protrudes therefrom to engage the work surface, the outer adjusting sleeve being slidable over the finder sleeve against the tension of the finder spring. Corresponding abutting surfaces are provided between the finder sleeve and the inner movable sleeve, the axial distance therebetween thereby being a measure of the depth to which a screw may be driven, and being varied in accordance with the adjusted axial position of the inner movable sleeve with respect to the housing. When the corresponding abutting surfaces are brought together, and when the finder sleeve has abutted against the work surface, further sinking of the screw into the work is precluded; and a pair of clutch members within the tool automatically disengage to prevent further driving of the tool bit.

Figure 1:
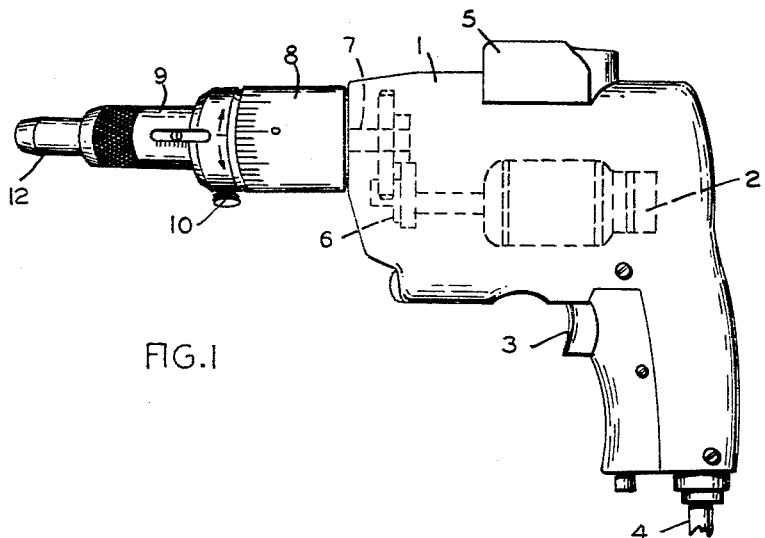
Fig. 1 is a pictorial view of a complete power-operated screwdriver with the depth gauge mounted thereon.

With reference to Figure 1, there is shown a main tool housing 1 containing an electric motor 2, on-off switch 3, electric line cord 4, reversing switch 5, and gear train 6 providing a speed-reducing coupling between motor 2 and spindle 7. It is noted that the essence of the invention is independent of the type of motive power used, as well as the shape and configuration of the main tool housing, and that the teachings of the present invention are equally applicable to an air tool whose housing is of overall cylindrical shape containing a suitable air motor in the rear portion thereof. Moreover, the use of the reversing switch 5 is considered standard in power-operated screwdrivers and like tools, it being understood that the reversing switch 5 forms no part of the invention. Furthermore, is is noted that although the present invention will hereinafter be described in detail with reference to power-operated screwdriver, that nevertheless, the techniques of the present invention are equally applicable to a power-operated nut-runner or similar tool.

Figure 4:
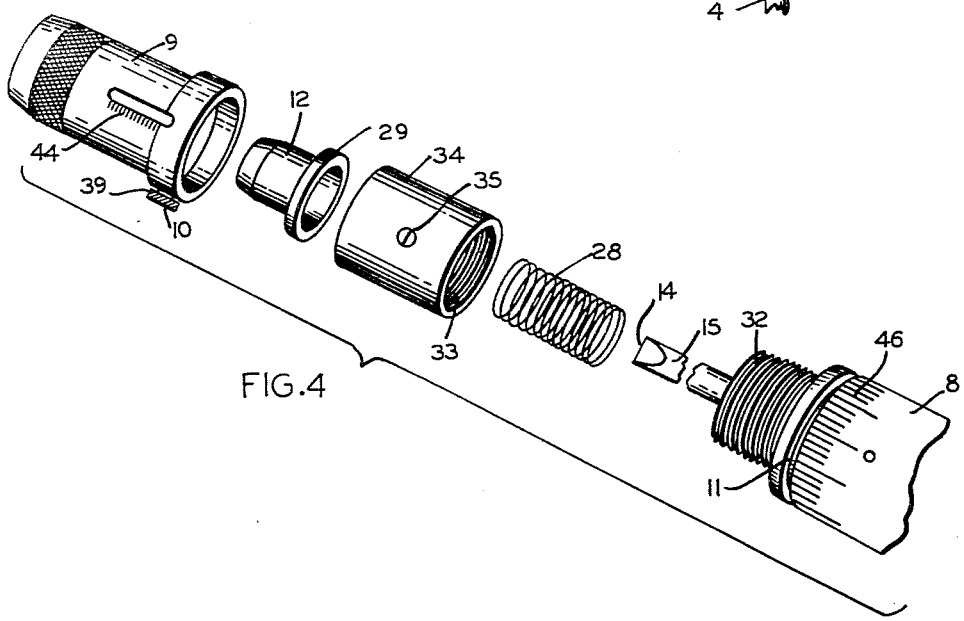
Fig. 4 is an exploded view of the depth gauge, showing the various components thereof and their assembly.

With reference to all of the enclosed drawings, clutch housing 8 is secured to the main tool housing 1 by threads or other suitable methods, as shown more particularly in Figure 3. An outer adjusting sleeve 9 is rotatably mounted upon clutch housing 8, but is axially restrained with respect thereto by means of screw 10 adapted to ride within an external annular groove 11 formed on clutch housing 8, as shown more particularly in Figures 3 and 4. A spring-loaded coaxial finder sleeve 12 is retained within the forward portion of outer adjusting sleeve 9 and projects therefrom to engage the work surface at the completion of the driving operation or during the duration thereof. A work-engaging screw 13 is mounted within the counterbore 40 of finder sleeve 12 (see Figure 3) and is adapted to be engaged by the tip 14 of driving bit 15. A round-head wood screw is shown only for purposes of illustration, and it is to be noted that the invention is equally applicable to a very wide variety of screw types and sizes, including of course metal screws, provided that the proper size of finder sleeve 12 and driving bit 15 are used.

With reference to Figure 3, spindle 7 is mounted in ball bearings 16 within clutch housing 8 and has a rotating, upper or driving clutch number 17 formed on its forwardmost portion. As is apparent from the drawing, clutch member 17 has a fixed axial relationship with respect to clutch housing 8. Seated within a blind axial bore 18 of spindle 7 is a coaxial chuck 19 having a rotatable lower or driven clutch member 20 splined thereon so as to engage the corresponding upper clutch member 17. Lower clutch member 20 is guided in clutch housing 8 by means of roller bearing 21, which is seated upon bearing washer 22. Clutch spacer 23 is provided between ball bearings 16 and clutch housing 8 to properly retain ball bearings 16 within the extension 31 of the main tool housing 1. Clutch spring 24 is seated within blind axial bore 18 and has one end thereof seated upon a ball 25, the tension of clutch spring 24 thus tending to force the clutch members 17, 20 apart. Chuck 19 is retained within clutch housing 8 under the tension of clutch spring 24 by means of shoulder 41, and serrations 42 are provided on the face of shoulder 41 to quickly decelerate chuck 19 as soon as the clutch members 17, 20 are disengaged.

Driving bit 15 is mounted in bore 26 of chuck 19 by means of ball-detent 27, and the tip 14 of driving bit 15 is guided within finder sleeve 12 to engage the head of screw 13. Finder sleeve 12 has a shoulder 29 that engages a flange 30 formed on the forwardmost portion of outer adjusting sleeve 9, thus retaining finder sleeve 12; and a finder spring 28 is seated at one end upon shoulder 29 and at the other end within a recess between the forward portion of chuck 19 and clutch housing 8, the tension of finder spring 28 thus constantly urging finder sleeve 12 forwardly.

Clutch housing 8 has a tubular extension 32 that is externally threaded to engage corresponding internal threads 33 formed within inner movable sleeve 34, which is in turn keyed to outer adjusting sleeve 9 for rotation in unison by means of pin 35 secured to inner movable sleeve 34 and guided within longitudinal slot 36 cut into outer adjusting sleeve 9, as shown more particularly in Figures 2 and 3.

As outer adjusting sleeve 9 is manually rotated, the keyed connection provided by pin 35 and slot 36 will allow inner movable sleeve 34 to be rotated in unison; and as inner movable sleeve 34 is so rotated, it will either advance upon or be retracted with respect to tubular extension 32 of clutch housing 8, depending on the direction of rotation. Corresponding internal abutting surfaces 37, 38 are provided between finder sleeve 12 and inner movable sleeve 34, respectively, to preclude further advance of the overall tool with respect to the finder sleeve 12 at the completion of the driving operation or during the duration thereof, the axial distance between abutting surfaces 37, 38 at the start of the driving operation being a measure of the depth to which a screw may be driven.

As is apparent from the foregoing description and from the drawing of Figure 3, finder sleeve 12 comprises a first member having a rearward abutting surface 37; and the axially-adjustable inner movable sleeve 34 comprises a second member (retained by the tubular extension 32 of clutch housing 8 rearwardly of the finder sleeve 12) and having a corresponding forward abutting surface 38.

Before the driving operation, the desired adjustment is made by manually rotating outer adjusting sleeve 9 so as to change the axial position of inner movable sleeve 34 relative to tubular extension 32 of clutch housing 8 (and thus to the overall tool) and thereby either to increase or decrease the axial distance between the corresponding abutting surfaces 37, 38 depending on the direction of manual rotation of outer adjusting sleeve 9. Outer adjusting sleeve 9 is axially restrained with respect to clutch housing 8 by means of screw 10 and annular groove 11, as previously explained; and after the desired adjustment has been made, screw 10 may be tightened against annular groove 11 by the opeartor exerting a slight turning pressure upon the knurled head 39 of screw 10, thereby preventing a maladjustment during the driving operation.

In order to accurately gauge the amount of depth to which the screw 13 may be driven into the work, suitable graduations are provided as shown in Figure 2. Along the side of slot 36 on the surface of outer adjusting sleeve 9, "coarse" graduations 44 are provided to correspond with an indicating notch 45 formed on the top of pin 35; and around the cylindrical surface of clutch housing 8, "fine" graduations 46 are provided to correspond with a second indicating notch 47 formed on the cylindrical surface of the upper portion of outer adjusting sleeve 9. Each of the "coarse" graduations 44 correspond to one complete revolution of the outer adjusting sleeve 9 and are equal to 0.050 inch. Moreover, there are fifty equally-spaced "fine" graduations 46, each of which thus corresponds to 0.001 of an inch of depth control; and therefore, since the axial distance between the corresponding abutting surfaces 37, 38 may be varied to an accuracy of at least one-thousandth of an inch, or better, the amount of penetration to which a screw 13 may be driven into the work is very closely and accurately controlled.

*Operation*

Assuming that the desired predetermined depth adjustment has been made, and further assuming that a screw 13 is properly seated within counterbore 40 of a suitable finder sleeve 12, the operation of the present invention is as follows:

For best results, and especially to prevent the work from splitting during the driving operation, a pilot hole or guide hole should be drilled into the work previously (in accordance with standard practices); and the body of screw 13 should be partially seated within the pilot hole as shown in Figure 3, while the head of screw 13 should be properly seated within counterbore 40 of finder sleeve 12.

As the operator exerts forward pressure on screw 13 by pushing forwardly on the tool, the tension of finder spring 28 is overcome; the entire tool, and in particular clutch housing 8 and outer adjusting sleeve 9, will slide forwardly over finder sleeve 12, which although stationary, is in a sense thus retracted relatively within outer adjusting sleeve 9, until tip 14 of driving bit 15 engages the head of screw 13. Continuous forward pressure of the operator upon the tool will then cause the tension of clutch spring 24 ot be overcome, whereupon the main tool housing 1, clutch housing 8, spindle 7, and upper clutch member 17 will slide forwardly relative to chuck 19 and driving bit 15; and by the same token, inner movable sleeve 34 and outer adjusting sleeve 9 will slide forwardly relative to driving bit 15 and finder sleeve 12 and thus lower clutch member 20 will tend to slide out of roller bearing 21 to engage upper clutch member 17 against the tension of clutch spring 24. Likewise, inner movable sleeve 34 will approach finder 12, or may even contact finder sleeve 12 depending on the initial adjustment of inner movable sleeve 34, against the further tension of finder spring 28. As the screw 13 is being driven into the work, the entire tool will be advanced relative to the work until such time when the end of finder sleeve 12 has engaged the work surface 43, and also, when the corresponding abutting surfaces 37, 38 between inner movable sleeve 34 and shoulder 29 of finder sleeve 12 abut together, whereupon the operator pressure upon the tool is taken up directly by the work surface 43 inasmuch as there is now a continuous connection between the work surface 43 and finder sleeve 12, inner movable sleeve 34, clutch housing 8, and hence main tool housing 1. Further driving of screw 13 will be precluded; and as the operator releases his pressure upon the tool, clutch spring 24 will cause the clutch members to disengage. Lower clutch member 20 will thus then slide back into roller bearing 21 into the position shown in Figure 3; and the serrations 42 will tend to grab against clutch housing 8 to quickly decelerate chuck 19 and driving bit 15, thus preventing the slotted head of screw 13, as well as the work surface 43, from being marred or scored.

Depending on the type and size of screw 13 used, as well as the type and size of driving bit 15 and finder sleeve 12 used, screw 13 may be sunk into the work so that its head either is flush with work surface 43 or else is countersunk with respect to work surface 43, or protrudes therefrom; and the depth of penetration of screw 13 may be controlled to very close tolerances (down to 0.001 of an inch), all depending upon the initial adjustment of inner movable sleeve 34. Moreover, corresponding abutting surfaces 37, 38 may abut together at the completion of the driving operation, or during the duration thereof, and either before or after finder sleeve 12 has engaged the work surface 43, again depending on the initial adjustment of inner movable sleeve 34. When, for example, a flat-head screw is to be countersunk, the axial distance between corresponding abutting surfaces 37, 38 will be initially increased as inner movable sleeve 34 is moved rearwardly towards the maximum depth position; and the abutting surfaces 37, 38 will contact each other at some point in the cycle after the finder sleeve 12 has engaged work surface 43. On the other hand, if it is desired to have the screw head protrude above the work surface 43, then the axial distance between the corresponding abutting surfaces 37, 38 will be initially decreased as inner movable sleeve 34 is moved forwardly with respect to tubular extension 32 towards the minimum depth position; and the abutting surfaces 37, 38 will contact each other at some point in the cycle previous to finder sleeve 12 engaging the work surface 43. It should be noted, of course, that if the inner movable sleeve 34 is adjusted all the way "down" in its extreme minimum depth position so that the corresponding abutting surfaces 37, 38 are in contact at the very onset before the screw 13 is inserted into finder sleeve 12, that the depth control mechanism will be "locked out," and that in fact, the screw 13 ordinarily will not be engaged by the tip 14 of driving bit 15 and the tool will not drive the screw 13 into the work at all. By the same token, however, it should be noted that should a longer driving bit 15 be employed, or should a smaller sized screw 13 be selected improperly for the particular finder sleeve 12, that the head of such a screw may not properly seat within counterbore 40 of finder sleeve 12. In such a case, if the screw 13 is not properly seated in counterbore 40 of finder sleeve 12, it may be altogether possible for the tip 14 of driving bit 15 to engage the head of screw 13 and drive screw 13 into the work. Ordinarily, however, the proper size of finder sleeve 12 should be chosen for the type and size of screws to be driven so that the head of screw 13 is properly seated within counterbore 40 of finder sleeve 12, as shown in Figure 3; and in this instance, if inner movable sleeve 34 is adjusted all the way "down" so that abutting surfaces 37, 38 are in contact at the very onset before screw 13 is inserted into finder sleeve 12, then, the head of screw 13 will not be driven into the work. Then, when inner movable sleeve 34 is adjusted rearwardly a slight amount from its extreme forward position, so that the axial distance between abutting surfaces 37, 38 is sufficient to just allow the finder sleeve 12 to be retracted rearwardly with respect to outer adjusting sleeve 9 so that the head of screw 13 will engage the tip 14 of driving bit 15, and also, to allow driving bit 15 and chuck 19 to be retracted rearwardly with respect to clutch housing 8 so that lower clutch member 20 will just engage upper clutch member 17, then, the adjustable finder mechanism has been adjusted for a minimum amount of penetration of screw 13 into the work, and correspondingly, a maximum amount of protrusion of the head of screw 13 with respect to the work surface 43. In some applications the screw may be frequently countersunk, as for example flathead wood screws; and in other applications, as for example round-head metal screws, it may be more desirable to allow the head of the screw to protrude above the work surface.

It is seen that the present invention fulfills the object of providing a depth gauge for a power-operated screwdriver and the like that will control the depth to which a screw may be driven to a very high degree of accuracy. Obviously many modifications may be made in the construction illustrated without departing from the basic spirit of the invention. Therefore, it is to be understood that within the scope of the appended claims the invention may be practiced other than as specifically described.

I claim:

1. In a power-operated tool of the character described having a suitable housing, a depth gauge adapted to control within predetermined desired limits the depth to which a fastener may be driven into the work, comprising, in combination, a pair of coaxial superposed sleeves comprising an outer adjusting sleeve and an inner movable sleeve keyed together for rotation in unison, said outer sleeve being axially restrained with respect to said housing of said tool but free to rotate about its longitudinal axis, said inner sleeve being operatively coupled to said housing in such a manner whereby the axial position of said inner sleeve with respect to said housing may be varied as said sleeves are rotated in unison by a manual manipulation of said outer sleeve, a coaxial finder sleeve loosely retained by said outer sleeve and projecting therefrom forwardly from said inner sleeve, resilient means to constantly urge said finder sleeve forwardly, and corresponding abutting surfaces between said finder sleeve and said inner sleeve, the initial axial distance therebetween being varied prior to the driving operation in accordance with the adjusted axial position of said inner sleeve with respect to said housing, whereby the contact of said corresponding abutting surfaces against each other together with the abutment of said finder sleeve against the work surface precludes further sinking of the fastener into the work.

2. In a power-operated tool of the character described, a depth gauge as defined in claim 1, wherein said outer and inner sleeves are keyed together by means of a pin secured to the outer surface of said inner sleeve and having an axis transverse to the axis of said inner sleeve and adapted to be housed and guided within a slot cut into the wall of said outer sleeve parallel to the axis of said outer sleeve and to move axially within said slot as said pair of sleeves are rotated in unison.

3. In a power-operated tool of the character described, a depth gauge as defined in claim 2, wherein said outer adjusting sleeve is rotatively mounted upon the forward housing of said tool and is axially restrained and may be locked against turning with respect to said forward housing by means of a screw operatively engaging and passing through a threaded hole formed in the rear portion of said outer adjusting sleeve on an axis transverse to the axis of said sleeve and with the lower portion of the shank of said screw engaging and guided within a coaxial annular groove formed on said forward housing, whereby said screw rides around the raceway formed by said coaxial annular groove as said outer adjusting sleeve is rotated about its axis, and whereby at any desired point, said outer adjusting sleeve may be locked against further rotation by turning said screw within said recess until said screw is tightly secured against the bottom of said groove.

4. An adjustable finder as defined in claim 3, wherein the amount of predetermined desired depth may be approximately gaged by means of graduations formed on the surface of said outer adjusting sleeve along the side of said slot cooperating with a corresponding indicating notch formed on the top surface of said pin that is axially movable within said slot, and may be accurately gaged by means of additional graduations formed on the forward portion of said housing around the cylindrical periphery thereof together with a cooperating indicating notch formed on the adjacent rear of said outer adjusting sleeve.

5. An adjustable finder as defined in claim 1, wherein said coaxial finder sleeve snugly guides the protruding tool bit and is retained with respect to said outer adjusting sleeve by means of a collar formed on the rear portion of said finder sleeve and positioned to shoulder against the inner portion of a radial flange formed on the forwardmost extremity of said outer adjusting sleeve and projecting inwardly towards the axis thereof.

6. An adjustable finder as defined in claim 5, wherein said resilient means to constantly urge said finder sleeve forwardly comprises a compression spring disposed around said tool bit within said adjustable finder and being seated at one end thereof against said housing and at the other end thereof against said collar of said finder sleeve.

7. An adjustable finder as defined in claim 1, wherein said inner sleeve is provided with internal threads that operatively engage corresponding external threads formed on a coaxial tubular extension projecting from the forwardmost portion of said housing and disposed within said adjustable finder, whereby the axial position of said inner sleeve with respect to said housing may be varied as said sleeves are rotated in unison.

8. A power-operated tool for driving fasteners to a predetermined desired depth, comprising, a main housing, a source of motive power within said main housing, a spindle mounted in bearings in the forward portion of said main housing, means to mechanically couple said spindle to said source of motive power, an upper clutch member formed on the forwardmost portion of said spindle, a blind axial bore within said spindle, a chuck coaxial with said spindle and having its rear portion mounted in said blind axial bore, a lower clutch member mounted coaxially on said chuck near the rearmost portion thereof so as to engage said upper clutch member, a clutch spring mounted in said blind axial bore and tending to force said upper and lower clutch members apart, a tool bit coaxially mounted in said chuck and protruding forwardly therefrom to engage a screw head, the tension of said clutch spring being overcome at the onset of the driving operation by the operator exerting forward pressure upon the housing against said screw and said tool bit, thereby causing said clutch members to engage, a clutch housing secured to the forward portion of said main housing and having a forwardmost tubular extension, threads formed on the external surface of said tubular extension, an inner movable sleeve having corresponding internal threads and mounted coaxially on said extension, an outer adjusting sleeve coaxial with said inner movable sleeve and keyed thereto for rotation in unison by a manual manipulation of said outer sleeve, said outer adjusting sleeve being rotatably mounted on said clutch housing but being restrained against relative axial movement with respect to said clutch housing, a finder sleeve coaxially and loosely mounted within the forward portion of said outer adjusting sleeve forwardly from said inner movable sleeve and protruding from said outer adjusting sleeve to abut against the work surface at the completion of the driving operation or during the duration thereof, the forward portion of said tool bit being guided within said finder sleeve, means to constantly urge said finder sleeve forwardly, corresponding abutting surfaces between said finder sleeve and said inner movable sleeve, the axial distance between said corresponding abutting surfaces being variable in accordance with the adjusted axial position of said inner movable sleeve relative to said extension of said clutch housing as said outer adjusting sleeve and said inner movable sleeve are rotated in unison by a manual manipulation of said outer adjusting sleeve, whereby the amount of axial distance between said corresponding abutting surfaces is a measure of the predetermined desired depth to which a screw may be driven, and whereby the abutment of said corresponding abutting surfaces, together with the abutment of said finder sleeve against said work surface precludes further sinking of said screw into the work and allows said clutch spring to disengage said upper and lower clutch members as the operator releases the forward pressure upon the tool.

9. A power-operated tool for driving fasteners to a predetermined desired depth, comprising, a housing, a source of motive power within said housing, an upper clutch member, means to mechanically couple said upper clutch member to said source of motive power, a coaxial lower clutch member adapted to engage said upper clutch member, a clutch spring tending to force said clutch members apart, the tension of said clutch spring being overcome at the onset of the driving operation by the operator exerting forward pressure upon the screwdriver causing said clutch members to engage, a tool bit, means to mechanically couple said tool bit to said lower clutch member, an inner movable sleeve mechanically coupled to said housing for an axial adjustment relative thereto, an outer adjusting sleeve coaxial with said inner movable sleeve and keyed thereto so that both sleeves may be rotated in unison by a manual manipulation of said outer adjusting sleeve, said outer adjusting sleeve being rotatably mounted on said housing and axially restrained thereto, a finder sleeve coaxially and loosely mounted within the forward portion of said outer adjusting sleeve forwardly from said inner movable sleeve and protruding from said outer adjusting sleeve to abut against the work surface at the completion of the driving operation or during the duration thereof, means to constantly urge said finder sleeve forwardly, corresponding abutting surfaces between said finder sleeve and said inner movable sleeve, the axial distance between said corresponding abutting surfaces being variable in accordance with the adjusted axial position of said inner movable sleeve relative to said housing as said outer adjusting sleeve and inner movable sleeve are rotated in unison by a manual manipulation of said outer adjusting sleeve, whereby the amount of axial distance between said corresponding abutting surfaces is a measure of the predetermined desired depth to which a screw may be driven, and whereby the abutment of said corresponding abutting surfaces, together with the abutment of said finder sleeve against said work surface precludes further sinking of said screw into the work and allows said clutch spring to disengage said upper and lower clutch members as the operator releases the forward pressure upon the tool.

10. A power-operated tool for driving a fastener to a predetermined desired depth, comprising, a housing, a source of motive power within said housing, a driving bit mounted in said housing and engaging said fastener, a pair of clutch members in said housing for mechanically coupling said source of motive power to said driving bit, resilient means tending to force said clutch members apart, the tension of said resilient means being overcome at the onset of the driving operation by the operator exerting forward pressure upon said tool and against said fastener and said driving bit, thereby causing said clutch members to engage, an axially movable sleeve mechanically coupled to said housing, means to vary the relative axial position of said movable sleeve with respect to said housing, a coaxial finder element loosely retained by said housing forwardly from said movable sleeve and projecting from said housing to engage the work surface at the completion of the driving operation or during the duration thereof, said finder element having a bore adapted to guide said driving bit, means to constantly urge said finder element forwardly against the retention of said housing, corresponding abutting surfaces between said movable sleeve and said finder element, the axial distance between said corresponding abutting surfaces being variable in accordance with the adjusted axial position of said movable sleeve relative to said housing, whereby the amount of axial distance between said corresponding abutting surfaces is a measure of the predetermined desired depth to which a fastener may be driven, and whereby the abutment of said corresponding abutting surfaces, together with the abutment of said finder element against said work surface, precludes further sinking of said screw into the work and allows said resilient means to disengage said upper and lower clutch members as the operator releases the forward pressure upon the tool.

11. A power-operated tool for driving an element to a predetermined desired depth, comprising, a housing having an open forward portion, a first member retained by said housing and having a portion projecting outwardly from said forward portion of said housing, said first member having a forward portion thereof adapted to abut against the work surface at the completion of the driving operation or during its duration, means to constantly urge said first member forwardly against the retention of said housing, a second member retained by said housing rearwardly of said first member and having at least a portion thereof axially adjustable with respect to said housing, manually-manipulatable means to axially adjust said portion of said second member with respect to said housing, a rotating driving clutch member within said housing and having a fixed axial relationship with respect to said housing, a rotatable driven clutch member within said housing and positioned forwardly of said driving clutch member, resilient means ordinarily tending to maintain said clutch members in disengagement and being overcome by the operator exerting forward pressure on said tool, a driving bit guided within said housing, means to couple said driving bit to said driven clutch member, a rearward abutting surface on said first member, and a corresponding forward abutting surface on said second member, the relative axial displacement between said corresponding abutting surfaces being adjusted in accordance with the axially adjusted portion of said second member, whereby the abutment of said corresponding abutting surfaces, together with the abutment of said forward portion of said first member against the work surface, precludes further driving of said element into the work, and whereby said resilient means will then automatically cause said clutch members to disengage to preclude further driving of said driving bit.

12. In a power-operated tool of the character described, a depth gauge adapted to control within predetermined desired limits the depth to which an element may be driven, comprising, in combination: a housing having an open forward portion, a first member retained by said housing and having a portion projecting outwardly from said forward portion of said housing, said first member having a forward portion thereof adapted to abut against the work surface at the completion of the driving operation or during its duration, means to constantly urge said first member forwardly against the retention of said housing, a second member retained by said housing rearwardly of said first member and having at least a portion thereof axially adjustable with respect to said housing, manually-manipulatable means to axially adjust said portion of said second member with respect to said housing, a rearward abutting surface on said first member, and a corresponding forward abutting surface on said second member, the relative axial displacement between said corresponding abutting surfaces being adjusted in accordance with the axially adjusted portion of said second member, whereby the abutment of said corresponding abutting surfaces, together with the abutment of said forward portion of said first member against the work surface, precludes further driving of said element into the work.

References Cited in the file of this patent

UNITED STATES PATENTS

| | | |
|---|---|---|
| 413,178 | Doe | Oct. 22, 1889 |
| 974,239 | Dalton | Nov. 1, 1910 |
| 2,430,044 | Campsmith | Nov. 4, 1947 |
| 2,613,704 | Sacrey | Oct. 14, 1952 |

FOREIGN PATENTS

| | | |
|---|---|---|
| 101,195 | Great Britain | Feb. 19, 1917 |
| 583,325 | Great Britain | Dec. 16, 1946 |
| 686,370 | France | Apr. 14, 1930 |

UNITED STATES PATENT OFFICE
CERTIFICATE OF CORRECTION

Patent No. 2,940,488                                June 14, 1960

Robert H. Riley, Jr.

It is hereby certified that error appears in the printed specification of the above numbered patent requiring correction and that the said Letters Patent should read as corrected below.

Column 2, line 20, for "is", first occurrence, read -- it --; column 3, line 51, for "opeartor" read -- operator --; column 4, line 25, for "ot" read -- to --; column 6, lines 46, 58, 66, and 72, for "An adjustable finder", each occurrence, read -- A depth gauge --; column 6, line 69 and column 7, line 2, for "adjustable finder", each occurrence, read -- depth gauge --.

Signed and sealed this 3rd day of January 1961.

(SEAL)
Attest:

KARL H. AXLINE                                   ROBERT C. WATSON
Attesting Officer                                 Commissioner of Patents